United States Patent
Rodoper et al.

(10) Patent No.: US 9,485,747 B1
(45) Date of Patent: Nov. 1, 2016

(54) SYSTEMS AND METHODS FOR ACQUIRING LOCATION DATA

(71) Applicant: AMAZON TECHNOLOGIES, INC., Reno, NV (US)

(72) Inventors: Mete Rodoper, Sunnyvale, CA (US); Abinash Mahapatra, Cupertino, CA (US)

(73) Assignee: Amazon Technologies, Inc., Reno, NV (US)

( * ) Notice: Subject to any disclaimer, the term of this patent is extended or adjusted under 35 U.S.C. 154(b) by 148 days.

(21) Appl. No.: 14/279,771

(22) Filed: May 16, 2014

(51) Int. Cl.
*H04W 64/00* (2009.01)

(52) U.S. Cl.
CPC .................................. *H04W 64/006* (2013.01)

(58) Field of Classification Search
CPC ..... H04W 64/00; H04W 4/02; H04W 48/04; H04L 29/08657; H04L 29/08936; G01S 5/0252; G01S 19/14; H04M 1/72577
See application file for complete search history.

(56) References Cited

U.S. PATENT DOCUMENTS

| | | | |
|---|---|---|---|
| 8,830,913 B1* | 9/2014 | Sosa | H04W 48/20 370/328 |
| 2010/0255856 A1* | 10/2010 | Kansal | G01S 5/0205 455/456.1 |
| 2013/0267255 A1* | 10/2013 | Liu | H04W 4/028 455/456.3 |
| 2014/0018111 A1* | 1/2014 | Farley | G01S 5/0252 455/456.6 |
| 2014/0045536 A1* | 2/2014 | Sydir | H04W 4/021 455/456.5 |
| 2015/0005014 A1* | 1/2015 | Huang | G01S 5/0263 455/456.5 |
| 2015/0188940 A1* | 7/2015 | Lapidous | H04W 12/12 726/15 |

FOREIGN PATENT DOCUMENTS

WO    WO 2013075748 A1 *   5/2013   .......... H04W 64/003

* cited by examiner

*Primary Examiner* — Kashif Siddiqui
(74) *Attorney, Agent, or Firm* — Lindauer Law, PLLC

(57) ABSTRACT

Positioning systems may be used to determine the location of computing devices in space. Described herein are systems, methods, and computer readable mediums for storing information determined to be reliable that is used to determine the location of a computing device. In some implementations, the system determines that a scan list is reliable based on factors such as characteristics associated with the type of device that generated the scan list, or based on the amount of times that the information in the scan list was detected over a period of time.

20 Claims, 8 Drawing Sheets

SYSTEMS AND METHODS FOR ACQUIRING LOCATION DATA

BACKGROUND

A client device may use positioning systems to determine the location of the client device. A positioning system may use a datastore to lookup the location of the client device based on information provided by the client device. However, the database information may be insufficient, resulting in the positioning system being unable to provide a location or an accurate location to the client device.

Figure 1:
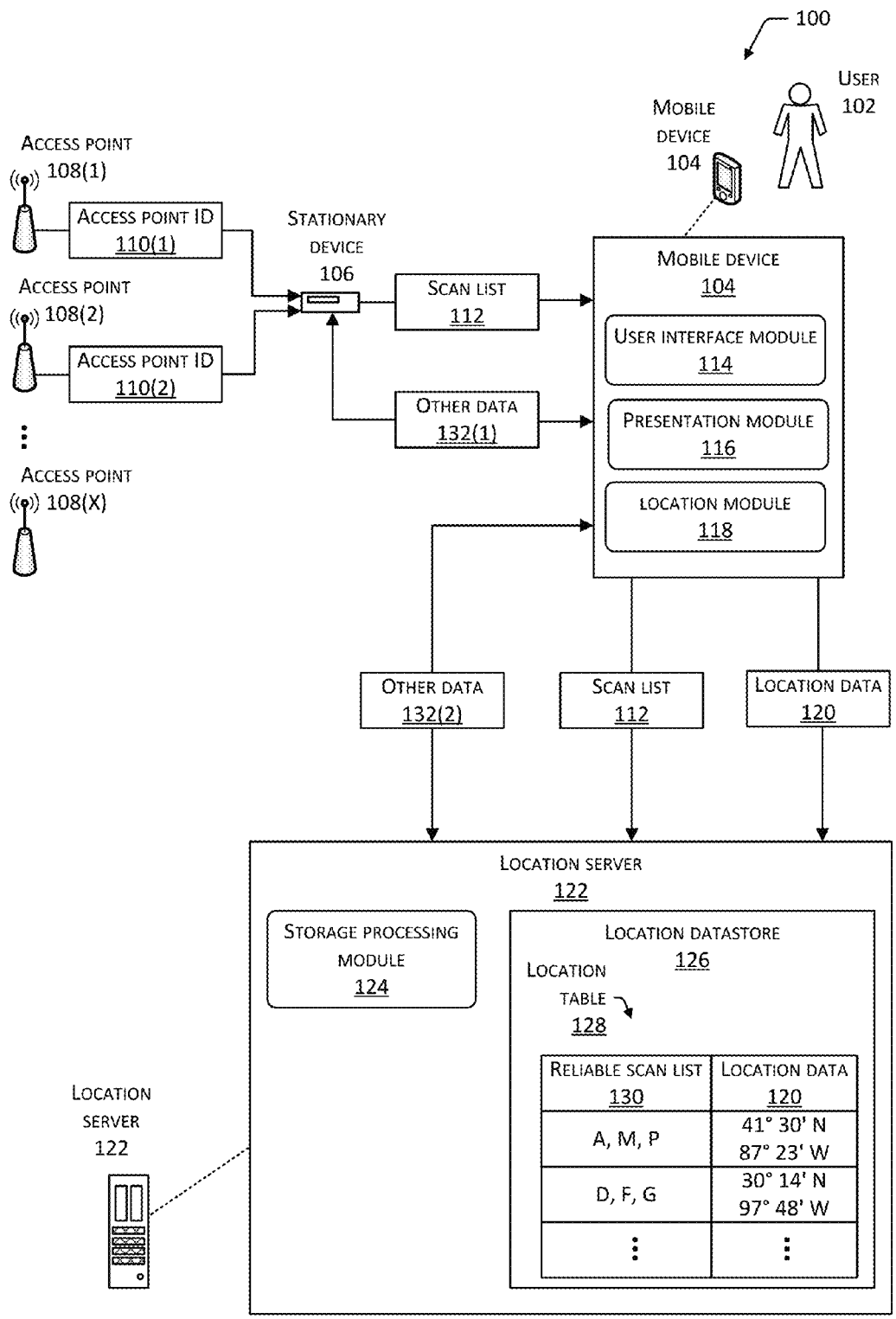
FIG. 1 is an illustrative system for storing reliable scan lists and depicts a location server receiving a scan list generated by a stationary device, and receiving location data generated by a mobile device.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

Positioning systems are used to determine the location of objects in space. Client devices (e.g., mobile devices or stationary devices) may use positioning systems to determine the location of the client device. A positioning system may use a database for looking up the location of a client device based on information provided by the client device. In one example, the information provided by the client device includes a list identifying detected wireless networks. The positioning system may determine a location of the client by looking up a location that is associated with the received list. However, the positioning system may not include the information needed to provide the location. For example, the database may not include any information about the location of the detected wireless networks.

This disclosure describes systems and methods for storing reliable information used by positioning systems (e.g., Wi-Fi®, Bluetooth®, or ZigBee® based positioning systems) such that a client device (e.g., a mobile phone) may present the location of the client device. Determining whether the information is reliable is based on a variety of factors discussed herein.

The system discussed herein includes a location server that manages information used to determine locations of other computing devices. The location server may comprise one or more computing devices such as one or more servers. The operations executed by the location server are discussed in more detail below.

The location server may be configured to operatively connect to one or more client devices using a network. The client devices may comprise a variety of computing devices such as a smartphone, a tablet computer, a laptop computer, an electronic book ("eBook") reader, a wearable computing device, a desktop computer, a television, a gaming console, and so forth.

The client device may be configured to detect the presence of wireless networks. For example, the client device may include a network detector configured to detect the presence of access points. An access point may comprise a computing device that enables other computing devices to wirelessly connect to a network, using wireless communication standards such as Wi-Fi®.

Detecting the presence of the access points may include using at least one of active scanning or passive scanning. Active scanning may include sending multiple probe requests and recording probe responses. Passive scanning may include acquiring information once data is transmitted by an access point.

Detecting the presence of the access points may include acquiring access point identifications of the detected access points. An access point identification ("ID") may comprise data representing an identification of the access point, and may be expressed using characters such as letters, numbers, symbols, and so forth. In one example, the access point ID comprises a service set identifier ("SSID"). The SSID may be described as a human-readable 1 to 32 byte string. An SSID may be modified by an administrative user of the access point. In another example, the access point ID may comprise a media access control ("MAC") address. The MAC address may be described as a unique combination of characters (e.g., letters, number, symbols, and so forth) that is assigned to a computing device that operates with a network. The MAC address may identify the manufacturer of a network adapter of the computing device. A manufacturer of the network adapter may hardwire or hard-code the MAC address onto the network adapter. Because the MAC address may be hard-coded and is unique to the network adapter, when compared to the SSID, typically MAC addresses are considered to be more unique.

The client device may be configured to generate a scan list. The scan list may comprise data representative of access point IDs acquired from detected access points. The scan list may also include other information, such as a timestamp indicating when the access points were detected. As discussed in more detail below, the scan list may be used by the location server as a reference for determining location of a client device.

The client device may be configured to generate location data representative of the location of the client device. Determination of the location may be based on a variety of one or more systems. These systems may include inertial navigation systems, dead reckoning navigation systems, satellite-based navigation, network positioning, tags, and so forth. The location data may include geolocation data such as latitude, longitude, and altitude of the client device, a street address, room designation, and so forth.

The client device may provide the scan list and the location data to the location server for processing. The location data may be described as being associated with the scan list because the location data may indicate where the scan list was generated.

The location server may include a location datastore configured to store a variety of information that may be used to determine the location of a computing device. The stored information may include information about a list of access point IDs and the locations associated with the list. Before the information is stored within the location datastore, the location server may be configured to determine whether the information is reliable.

Determining whether the information is reliable may be based on a variety of factors. For example, reliability may be determined based on the amount of times access point IDs are detected over a period of time, the manufacturer of the computing device associated with the access point ID, and so forth.

Once a scan list is deemed reliable, the location server may update the datastore to include the reliable scan list along with the location data that is associated with the reliable scan list. By storing the reliable scan list with the associated location data, computing devices (e.g., the mobile phones, tablet computers, laptops, wearable devices, and so forth) may present their location by acquiring location data from the location server based on the access point IDs that are detected by the computing devices. In one example, the location server receives a request for location data from a first computing device. The request may include a scan list of detected access point IDs. The location server may determine which location data is associated with or corresponds to the scan list. Thereafter, the location server may provide the location data that is associated with the scan list, resulting in the computing device being able to present its location.

In some implementations, a first client device generates and provides at least one of the scan list or the location data to a second client device that in turn provides the scan list to the location server. In one example, the first client device comprises a stationary device and the second client device comprises a mobile device. The mobile device may be described as a computing device that is or is expected to be transported during normal usage. For example, the mobile device may comprise a smartphone, a tablet computer, a laptop computer, a wearable computing device, an electronic book ("eBook") reader, an in-vehicle communication system, and so forth. When compared to stationary devices, mobile devices may generally generate location data more easily because the mobile device may be easier to transport to another location to allow location detection. For example, when determining the location of a computing device using Global Positioning System ("GPS"), a mobile device may be configured to prompt the user to move the mobile device to another location to allow for acquisition of signals from navigational satellites.

The stationary device may be described as a computing device that is not expected to be transported during normal usage. For example, the stationary device may comprise a desktop computer, a television, a gaming console, a server, or a set-top box. When compared to the wireless networks detected by mobile devices, the wireless networks detected by stationary devices may be more consistent because the stationary devices generally are not transported during normal usage. Accordingly, when determining a location associated with a list of detected wireless networks, wireless networks detected by stationary devices may be considered more reliable when compared with wireless networks detected by mobile devices.

When client devices are able to share information (e.g., the scan list and the location data), the location included within the location data may be changed from the actual location to another location for privacy purposes. For example, the client devices may be configured to execute a fuzzing algorithm which causes the location to be offset by a randomly determined distance so that the user of one client device will not obtain the exact location of other computing devices.

By determining whether acquired scan lists are reliable based on the factors discussed herein, databases of wireless-based positioning systems may be populated with accurate information in a more efficient manner. As a result, a client device may present the location of the client device based on information determined to be reliable.

Illustrative System

FIG. 1 is an illustrative system for storing reliable scan lists and depicts a location server receiving a scan list generated by a stationary device, and receiving location data generated by a mobile device. A user 102 is depicted with a corresponding mobile device 104 configured to present information to the user 102 for consumption.

The mobile device 104 may be described as a computing device that is or is expected to be transported during normal usage. For example, the mobile device 104 may comprise a smartphone, a tablet computer, a laptop computer, a wearable computing device, an electronic book ("eBook") reader, an in-vehicle communication system, and so forth. Although certain devices such as a desktop computer, a television, a gaming console, a server, or a set-top box may be described as devices that may not be expected to be transported during normal usage, these devices may comprise the mobile device 104, if these devices are transported during normal usage. In some implementations, the mobile device 104 is implemented as a client device, which is discussed in more detail below with regard to FIG. 2.

The system 100 may include a stationary device 106. The stationary device 106 may be described as a computing device that is not expected to be transported during normal usage. For example, the stationary device 106 may comprise a desktop computer, a television, a gaming console, a server, or a set-top box. Although certain devices may be described as devices that are expected to be transported during normal usage, such devices may comprise the stationary device 106, if these devices are not transported during normal usage. For example, the following computing devices may comprise the stationary device 106 a smartphone, a tablet computer, a laptop computer, a wearable computing device, an electronic book ("eBook") reader, an in-vehicle communication system, and so forth. In some implementations, the stationary device 106 is implemented as the client device that is discussed in more detail below with regard to FIG. 2.

The system 100 may include one or more access points 108(1), 108(2), . . . 108(X). An access point 108 may comprise a computing device that enables other computing devices to wirelessly connect to a network, using wireless communication standards such as Wi-Fi®.

An access point 108 may have an access point ID 110 that may represent an identification of the access point 108. The access point ID may be expressed using characters such as letters, numbers, symbols, and so forth. In one example, the access point ID comprises a service set identifier ("SSID"). The SSID may be described as a human-readable 1 to 32 byte string. An SSID may be modified by an administrative user of the access point 108. In another example, the access point ID 110 may comprise a media access control ("MAC") address. The MAC address may be described as a unique combination of characters (e.g., letters, number, symbols, and so forth) that is assigned to a computing device that operates with a network. The MAC address may identify the manufacturer of the computing device. When compared to the SSID, typically the MAC address may be considered more unique.

The stationary device 106 may be configured to detect the presence of the access points 108. Detecting the presence of the access points 108 may include acquiring the access point IDs 110 of the detected access points 108. In one example, the stationary device 106 detects the presence of the access points 108(1) and 108(2), which includes acquiring the access point IDs 110(1) and 110(2).

The stationary device 106 may generate a scan list 112. The scan list 112 may comprise data representative of the detected access points IDs 110. The scan list 112 may also include other information, such as a timestamp indicating when the access points 108 were detected. As discussed in more detail below, the scan list 112 may be used as a reference for determining location. The scan list 112 may comprise access point data that includes data corresponding to at least one access point 108. The data corresponding to the at least one access point 108 may include a variety of information such as access point ID 110 and information about a longevity of the access point 108. The information about the longevity of the access point 108 may indicate the amount of time a particular access point 108 has been operating, or may indicate which times a particular access point 108 is available. The information about the longevity of the access point 108 may indicate how long the access point ID(s) 110 have been available. For example, the information may indicate the access point 108 has been wirelessly providing the access point ID(s) 108 for a particular time period. The particular time period may include certain hours of certain days, a threshold period of time (e.g., the last six months). The longevity may be indicative of a persistence of the access point 108 or other network node from one point in time to another. When a particular access point ID 110 is available, the stationary device 106 is able to wirelessly obtain the particular access point ID 110 to generate the scan list 112.

The stationary device 106 may detect the presence of wireless computing devices using at least one of active scanning or passive scanning. Active scanning may include sending multiple probe requests and recording probe responses. Passive scanning may include acquiring information once data is transmitted by an access point.

The mobile device 104 may be operatively connected to the stationary device 106 using one or more networks (not shown). The one or more networks may include one or more public networks such as the Internet, private networks, or a combination of both. The network facilitating communication between the mobile device 104 and the stationary device 106 may include a variety of networks, such as a local network, a wide area network ("WAN"), broadcast network, a personal area network ("PAN"), a wired and wireless local area network ("LAN"), and so forth. In some implementations, the network includes at least one of Ethernet, Wi-Fi® as promulgated by the Wi-Fi Alliance, 3G and 4G, Bluetooth® as promulgated by the Bluetooth® Special Interest Group, and so forth. In some implementations, the devices and systems described herein are configured to directly connect to each other.

The stationary device 106 may provide the scan list 112 to the mobile device 104 using the network described above. The stationary device 106 may provide the scan list 112 to the mobile device 104 in response to receiving a request from the mobile device 104 to provide the scan list 112.

The mobile device 104 may include a user interface module 114. The user interface module 114 may be configured to provide a user interface to the user 102 or to the mobile device 104. In one implementation, the user interface may be a web interface presented via the network and accessible to the user 102. In another implementation the user interface may comprise an application programming interface ("API") that enables communication such as sending requests for the scan list 112 from the mobile device 104 to the stationary device 106. The user interface may be configured to allow the user 102 to logon to the mobile device 104 by inputting credentials.

The mobile device 104 may include a presentation module 116 configured to present information to the user 102 using output devices of the mobile device 104. For example, the presentation may include displaying the information using a display device of the mobile device 104 or producing audio using speakers of the mobile device 104.

The mobile device 104 may include a location module 118. The location module 118 may determine a location of the mobile device 104 by generating location data 120 indicative of the position of the mobile device 104. The location module 118 may be configured to determine the location of the mobile device 104 based on one or more systems. These systems may include inertial navigation systems, dead reckoning navigation systems, satellite-based navigation, network positioning, tags and so forth.

The inertial navigation system may employ sensors such as acceleration sensors, motion sensors and rotation sensors to calculate the position of the mobile device 104 based on integration of these motions relative to a reference point. The dead reckoning navigation system may determine the location of the mobile device 104 by integrating compass headings and estimated stride lengths of the user 102 to determine displacement from a reference point. The satellite-based navigation system may use signals provided at least in part by orbital satellites to generate the location of the receiver that may be in the mobile device 104. Network positioning may involve interrogating one or more cellular network access points to determine position based at least in part on radio frequency signal strength, association of a network address or access point 108 with a previously determined location, and so forth.

The location module 118 may also determine the location of the mobile device 104 by receiving information from one or more location tags in an environment that is indicative of the location of the mobile device 104. Location tags may include radio-frequency identification ("RFID"), optical code tags, near field communication ("NFC") tags, acoustic tags, and so forth.

The location data 120 may be indicative of the location of the mobile device 104. For example, the location data may include geolocation data such as latitude, longitude, and altitude of the mobile device 104, a street address, room designation, and so forth.

In FIG. 1, the system 100 includes a location server 122. The location server 122 may comprise one or more computing devices which manages information used to determine locations of computing devices. The location server 122 may be communicatively connected to the mobile device 104 using the network described above. In some implementations, the location server 122 may be communicatively connected to other computing devices (e.g., one or more stationary devices 106, other mobile devices 104, and so forth) using the network described above. In one example, the mobile device 104 provides the scan list 112 to the location server 122.

The location server 122 may include a storage processing module 124 configured to execute a variety of computational tasks. The location server 122 may include a location datastore 126 configured to store a variety of information that may be used to determine the location of a computing device. The location datastore 126 may include a location table 128 storing information that may be visualized by an administrator as organized in columns and rows. The information stored in the location table 128 is discussed in more detail below.

The storage processing module 124 may analyze the scan list 112 to determine whether any of the detected access point IDs 110 included within the scan list 112 are reliable. The determination of whether an access point ID 110 is reliable may be determined based on a variety of factors such as the amount of times the access point ID 110 was detected over a period of time, the manufacturer of the computing device associated with the access point ID 110, and so forth. Determining whether a detected access point 108 is reliable is discussed in more detail with regard to FIG. 4. In one example, the scan list 112 includes a list of the following four access point IDs 110: "A", "B", "M", and "P". The storage processing module 124 may determine whether each of these four access point IDs 110 are reliable.

Based on the analysis of the scan list 112, the storage processing module 124 may generate a reliable scan list 130 comprising data that includes the reliable access point IDs 110. Continuing with the example where the access point IDs 110 include "A", "B", "M", and "P", the storage processing module 124 determines that "A", "M", and "P" are reliable. In response, the storage processing module 124 generates the reliable scan list 130 including "A", "M", and "P". In FIG. 1, this example reliable scan list 130 is depicted in the first row of the location table 128.

The location table 128 also includes a column labeled location data 120. This column includes the location data 120 that is associated with or corresponds to the reliable scan lists 130. Continuing with the example, the location table 128 depicts the reliable scan list 130 "A", "M", and "P" being associated with the following location data 120, which comprises a latitude and longitude: 41° 30' N, 87° 23' W.

In the example, the user 102 walks into a room that includes the stationary device 106. The stationary device 106 has been detecting the presence of wireless devices (e.g., the access points 108) over a period of time. The stationary device 106 has also been gathering information about the detections. The gathered information may include the access point IDs 110 and timestamp information indicative of when the access point IDs 110 were gathered. In this example, the stationary device 106 does not have the capability to determine its location. When the user 102 walks near the stationary device 106 with the mobile device 104, the stationary device 106 provides the scan list 112 to the mobile device 104. The mobile device 104 is configured to determine the location of the mobile device 104 using the location module 118. The mobile device 104 provides the scan list 112 and the location data 120 to the location server 122. The location server 122 then determines whether information within the scan list 112 is reliable. For the information that is determined to be reliable, the location server 122 may store the reliable information with the associated location data 120.

By storing the reliable scan list 130 with the associated location data 120, computing devices (e.g., the mobile device 104 and the stationary device 106) may present its location by acquiring the location data 120 from the location server 122. The location server 122 may receive a request for location data 120 from a computing device using the network described above. The request may include a scan list 112 of detected access point IDs 110. The location server 122 may determine which location data 120 is associated with or corresponds to the scan list 112. For example, the location server 122 may query the reliable scan list 130 column of the location table 128 for a match of the scan list 112 provided by the computing device. The location server 122 may provide the location data 120 that is associated with the scan list 112, resulting in the computing device being able to present its location.

In FIG. 1, other data 132(1) is provided between the mobile device 104 and the stationary device 106, and other data 132(2) is provided between the mobile device 104 and the location server 122. The other data 132(1) and 132(2) may include administrator preferences, account information associated with the user 102, and so forth.

Although FIG. 1 depicts the stationary device 106 receiving the access point IDs 110 from the access points 108, in some implementations, the stationary device 106 receives the other types of identifications from other types of network nodes (not shown). A network node may comprise a computing device configured to wireless communicate with other computing devices. In one example, the stationary device 106 may receive a MAC address from at least one of a stereo, a set top box, a desktop computer, a tablet computer, and so forth.

Figure 2:
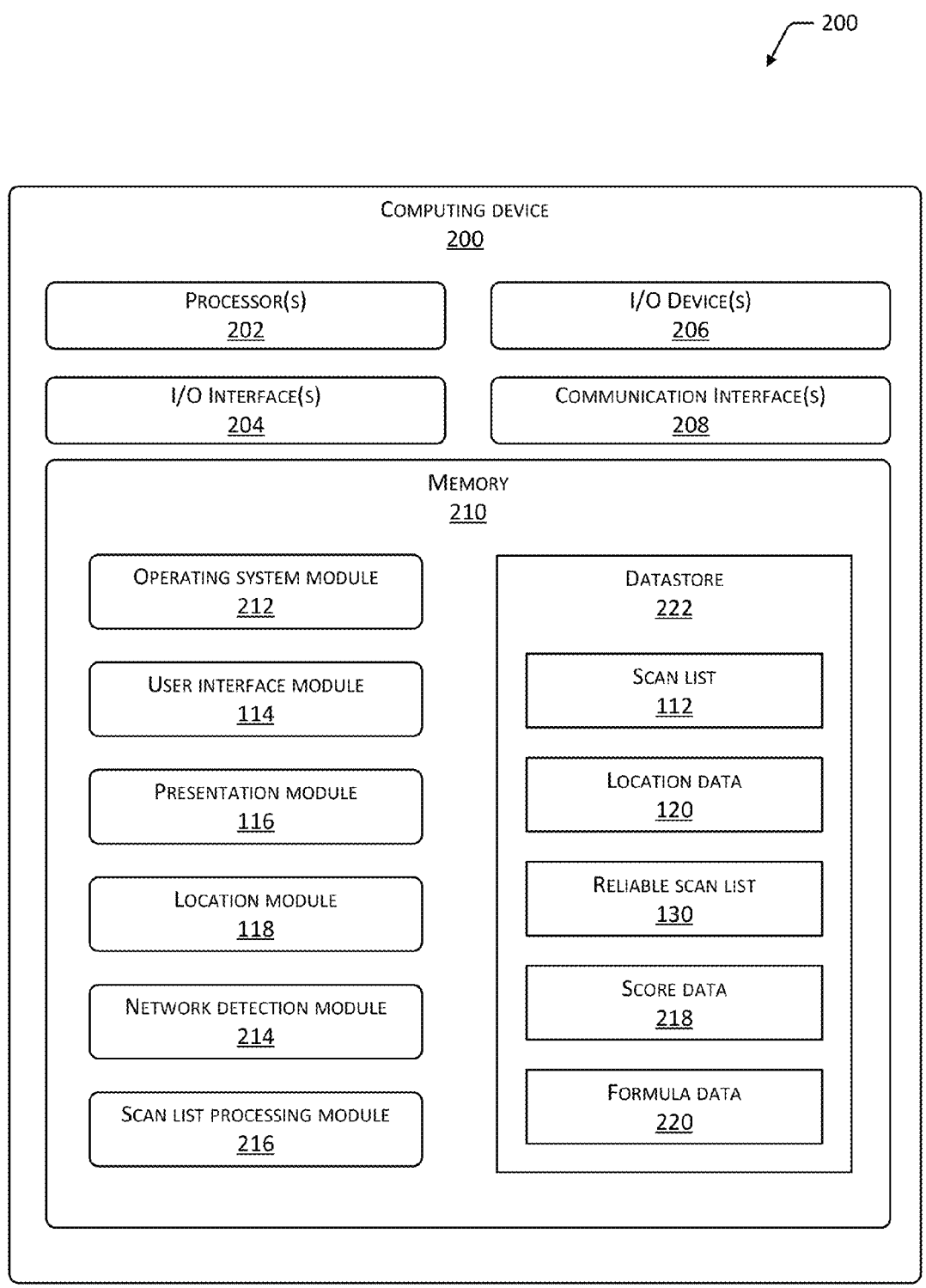
FIG. 2 is a block diagram of a client device configured to acquire and provide scan lists and location data.

FIG. 2 is a block diagram of a computing device 200 (e.g., a client device) configured to acquire and provide one or more scan lists 112 and location data 120. At least one of the mobile device 104 or the stationary device 106 may be a network node, and may be implemented by the computing device 200. The computing device 200 may include at least one hardware processor 202 (or "processor") configured to execute stored instructions. The at least one hardware processor 202 may comprise one or more cores.

The computing device 200 includes at least one input/output ("I/O") interface 204 which enables portions of the computing device 200 (e.g., the hardware processor 202) to communicate with other devices. The I/O interface 204 may be configured to implement various protocols, such as inter-integrated circuit ("I2C"), serial peripheral interface bus ("SPI"), Universal Serial Bus ("USB"), RS-232, HDMI, TOSLINK, Bluetooth®, and so forth. The at least one I/O interface 204 may be operatively connected to at least one I/O device 206. In some implementations, certain I/O devices 206 are physically incorporated with the computing device 200 or externally placed.

The at least one I/O interface 204 may be operatively connected to one or more I/O devices 206. The I/O devices 206 may include input devices such as one or more of a keyboard, a touch sensor, and so forth. The I/O devices 206 may also include output devices such as one or more of a display, printer, and so forth. In some embodiments, the I/O devices 206 may be physically incorporated with the computing device 200 or may be externally placed and communicatively coupled thereto.

The I/O devices 206 may include a location sensor (not shown) configured to generate the location data 120. The location data 120 may include geolocation data that is indicative of a latitude, longitude, and altitude of the computing device 200. The location sensor may also determine the location of the computing device 200 using an inertial navigation system, dead-reckoning navigation system, network positioning system, radio position finding system, satellite-based navigation system, an accelerometer system, a gyroscope system, and so forth. The satellite-based system may include one or more of a Global Positioning System receiver, a GLONASS receiver, a Galileo receiver, an Indian Regional Navigational Satellite System, and so forth.

The computing device 200 may include at least one communication interface 208. The communication interface 208 may be configured to provide communications between the computing device 200 and other devices, routers, access points, and so forth. The communication interface 208 may include an Ethernet interface that connects to the network.

The computing device 200 may also include one or more busses or other internal communications hardware or software that allow for the transfer of data between the various modules and components of the computing device 200.

As illustrated in FIG. 2, the computing device 200 may include at least one memory 210 or memory device. The memory 210 may include at least one non-transitory computer-readable storage media ("CRSM"). The CRSM may include at least one of an electronic storage medium, a magnetic storage medium, an optical storage medium, a quantum storage medium, or a mechanical computer storage medium. The memory 210 may include computer readable instructions, data structures, program modules, and other data for the operation of the computing device 200.

The memory 210 may include at least one operating system ("OS") module 212. The OS module 212 may be configured to manage hardware resources such as the I/O interface 204, the I/O devices 206, the communication interface 208, and provide various services to applications or modules executing on the hardware processor 202. The memory 210 may also store at least one of the following modules which may be executed as foreground applications, background tasks, daemons, and so forth.

The memory 210 may include the user interface module 114 configured to provide a user interface to the user 102 or to the computing device 200. In one implementation, the user interface may be a web interface presented via the network and accessible to the user 102. In another implementation, the user interface may comprise an application programming interface ("API") that enables communication such as sending requests for items from the computing device 200 to the location server 122.

The memory 210 may include the presentation module 116 that is configured to present information using output devices 206 of the computing device 200. The presentation may include displaying the information using a display device 206 of the computing device 200 or producing audio using speakers 206 of the computing device 200.

The memory 210 may include the location module 118 configured to determine the location of the computing device 200. The location module 118 may be configured to determine the location of the computing device 200 based on one or more systems. These systems may include inertial navigation systems, dead reckoning navigation systems, satellite-based navigation, network positioning, tags, hybrid positioning systems, and so forth.

The inertial navigation system may employ sensors such as acceleration sensors, motion sensors, and rotation sensors to calculate the position of the computing device 200 based on integration of these motions relative to a reference point. The dead reckoning navigation system may determine the location of the computing device 200 by integrating compass headings and estimated stride lengths of the user 102 to determine displacement from a reference point. The satellite-based navigation system may use signals provided at least in part by orbital satellites to generate the location of the receiver that may be in the computing device 200. Network positioning may involve interrogating one or more cellular network access points 108 to determine position based at least in part on radio frequency signal strength, association of a network address or access point 108 with a previously determined location, and so forth. Hybrid positioning systems may involve using several different positioning technologies. For example, GPS combined with cell tower signals, wireless internet signals, Bluetooth® signals, and so forth. Hybrid positioning systems may be used to overcome limitations of GPS, which may work poorly indoors or between tall buildings.

The location module 118 may also determine the location of the mobile device 104 by receiving information from one or more location tags in an environment that is indicative of the location of the mobile device 104. Location tags may include RFID, optical code tags, NFC tags, acoustic tags, and so forth.

The memory 210 may include a network detection module 214 configured to generate the scan list 112. The scan list 112 may comprise identifications of wireless computing devices such as the access points 108. The scan list 112 may also include other information, such as a timestamp indicating when the wireless computing devices were detected. The network detection module 214 may detect the presence of wireless computing devices using at least one of active scanning or passive scanning. Active scanning may include sending multiple probe requests and recording probe responses. Passive scanning may include acquiring information once data is transmitted by an access point.

The memory 210 may include a scan list processing module 216 configured to analyze the scan list 112 to determine whether any of the detected IDs (e.g., the access point IDs 110) included within the scan list 112 are reliable. Determining whether the IDs 110 are reliable may be determined based on a variety of factors such as the amount of times the ID 110 was detected over a period of time, the manufacturer of the computing device associated with the access point ID 110, and so forth. The functions performed by the storage processing module 124 with regard to determining reliability may be performed by the scan list processing module 216. Based on the analysis of the scan list 112, the scan list processing module 216 may generate the reliable scan list 130 comprising data that includes reliable IDs.

The scan list processing module 216 may be configured to generate score data 218. The score data 218 may represent a score that is determined for each identification included within the scan list 112. For example, the scan list processing module 216 may generate a first score for the access point ID 110(1) and a second score for the access point ID 110(2). These access point IDs 110(1) and 110(2) may be determined to be reliable if the scores are equal to or greater than a threshold score. The scan list processing module 216 may be configured to generate the score data 218 based on formula data 220. The formula data 220 may be configurable. The scan list processing module 216 may enable an administrative user of the computing device 200 to configure the formula data 220 applied to the scan list 112 to determine the score data 218. For a particular scan list 112, an administrative user may desire to manage which metrics are used to generate the score based on a historical analysis of which metrics correspond to a higher likelihood of reliability. In some implementations, the formula data 220 is hard-coded. When compared to configurable formula data 220, hard-coded formula data 220 may be described as being more difficult to change. In some implementations, the location server 122 modifies the formula data 220. For example, the location server 122 may change the metrics used to generate the score data 218. The location server 122 may provide the formula data 220 to at least one of the mobile device 104 or the stationary device 106.

In some implementations, the memory 210 includes a datastore 222 for storing information. The datastore 222 may use a flat file, database, linked list, tree, or other data structure to store the information. In some implementations, the datastore 222, or a portion thereof, may be distributed across at least one other device, such as a server, a network storage device, and so forth. As illustrated in FIG. 2, the datastore 222 may include at least one of the scan list 112, the location data 120, the reliable scan list 130, the score data 218, or the formula data 220. The datastore 222 may include other data (not shown), which may include information such as administrator preferences, account information associated with the user 102, and so forth.

Figure 3:
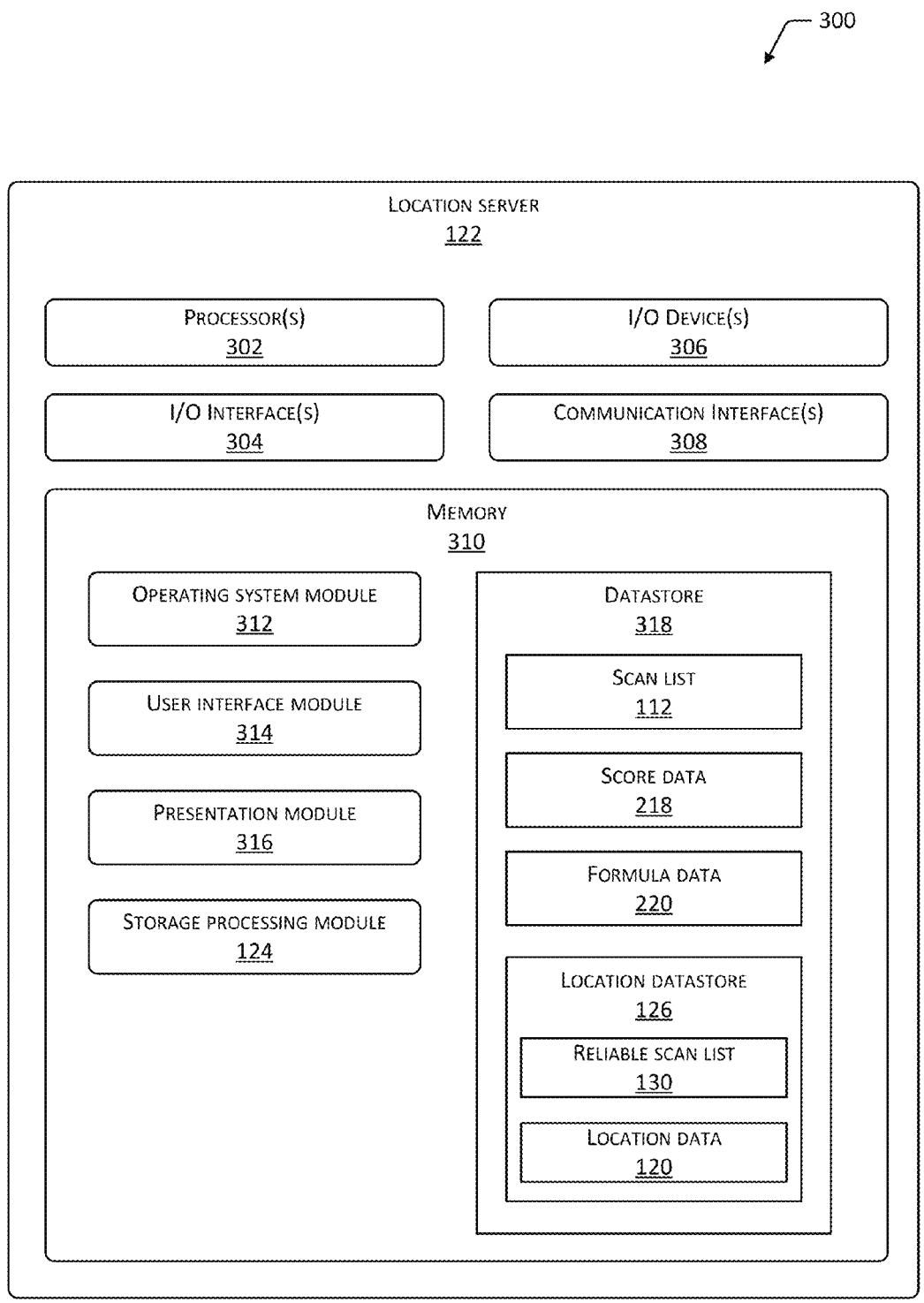
FIG. 3 is a block diagram of the location server configured to determine whether scan lists are reliable and store reliable scan lists with location data in the location datastore.

FIG. 3 is a block diagram 300 of the location server 122 configured to determine whether one or more scan lists 112 are reliable, and store reliable scan lists 130 associated with location data 120. The functions associated with the location server 122 described in this disclosure may be implemented by one or more servers, and by one or more entities. For example, in one implementation, one location server 122 may acquire the scan lists 112 and location data 120, while another determines reliability of the scan lists 112. The location server 122 may be physical server devices or virtual servers executing on physical server devices.

The location server 122 may include at least one hardware processor 302 (or "processor") configured to execute stored instructions. The at least one hardware processor 302 may comprise one or more cores.

The location server 122 includes at least one I/O interface 304 that enables portions of the location server 122 (e.g., the hardware processor 302) to communicate with other devices. The I/O interface 304 may be configured to implement various protocols, such as inter-integrated circuit ("I2C"), serial peripheral interface bus ("SPI"), Universal Serial Bus ("USB"), RS-232, HDMI, TOSLINK, Bluetooth®, and so forth. The at least one I/O interface 304 may be operatively connected to at least one I/O device 306. In some implementations, certain I/O devices 306 are physically incorporated with the location server 122 or externally placed.

The at least one I/O interface 304 may be operatively connected to one or more I/O devices 306. The I/O devices 306 may include input devices such as one or more of a keyboard, a touch sensor, and so forth. The I/O devices 306 may also include output devices such as one or more of a display, printer, and so forth. In some embodiments, the I/O devices 306 may be physically incorporated with the location server 122 or may be externally placed and communicatively coupled thereto.

The location server 122 may include at least one communication interface 308. The communication interface 308 may be configured to provide communications between the location server 122 and other devices, routers, access points, and so forth. The communication interface 308 may include an Ethernet interface which connects to the network.

The location server 122 may also include one or more busses or other internal communications hardware or software that allow for the transfer of data between the various modules and components of the location server 122.

As illustrated in FIG. 3, the location server 122 may include at least one memory 310 or memory device. The memory 310 may include at least one non-transitory computer-readable storage media ("CRSM"). The CRSM may include at least one of an electronic storage medium, a magnetic storage medium, an optical storage medium, a quantum storage medium, or a mechanical computer storage medium. The memory 310 may include computer readable instructions, data structures, program modules, and other data for the operation of the location server 122.

The memory 310 may include at least one operating system ("OS") module 312. The OS module 312 may be configured to manage hardware resources such as the I/O interface 304, the I/O devices 306, the communication interface 308, and provide various services to applications or modules executing on the hardware processor 302. The memory 310 may also store at least one of the following modules which may be executed as foreground applications, background tasks, daemons, and so forth.

The memory 310 may include a user interface module 314 configured to provide a user interface to the user 102 or to the location server 122. In one implementation, the user interface may be a web interface presented via the network and accessible to the user 102. In another implementation the user interface may comprise an application programming interface ("API") that enables communication such as sending requests for items from the location server 122 to a client device, such as the computing device 200.

The memory 310 may include a presentation module 316 that is configured to present information using output devices of the location server 122. The presentation may include displaying the information using a display device of the location server 122 or producing audio using speakers of location server 122.

The memory 310 may include the storage processing module 124 configured to execute a variety of computational tasks. The storage processing module 124 may analyze the scan list 112 to determine whether any of the detected IDs (e.g., the access point IDs 110) included within the scan list 112 are reliable. Determining whether the IDs are reliable may be determined based on a variety of factors such as the amount of times the ID was detected over a period of time, the manufacturer of the computing device associated with the ID, and so forth. Based on the analysis of the scan list 112, the storage processing module 124 may generate the reliable scan list 130 comprising data that includes reliable IDs.

The storage processing module 124 may be configured to generate the score data 218. The score data 218 may represent a score that is determined for each identification included within the scan list 112. For example, the scan list processing module 216 may generate a first score for the access point ID 110(1) and a second score for the access point ID 110(2). These access point IDs 110(1) and 110(2) may be determined to be reliable if the scores are equal to or greater than a threshold score. The storage processing module 124 may be configured to generate the score data 218 based on the formula data 220. The formula data 220 may be configurable. The storage processing module 124 may enable an administrative user of the location server 122 to configure the formula data 220 applied to the scan list 112 to determine the score data 218. For a particular scan list 112, an administrative user may desire to manage which metrics are used to generate the score based on a historical analysis of which metrics correspond to a higher likelihood of reliability.

The storage processing module 124 may be configured to manage the information stored in the location datastore 126. In some implementations, the storage processing module 124 is configured to associate the location data 120 with the reliable scan list 130 and store this information in the location datastore 126.

In some implementations, the storage processing module 124 is configured to retrieve location data 120 from the location datastore 126 based on information provided by the computing device 200. For example, the computing device 200 may provide a request for location data 120 associated with a particular scan list 112. The storage processing module 124 may query the location datastore 126 for a field that includes the identifications within the scan list 112. Once the storage processing module 124 determines that the location data 126 includes a field that includes the IDs that were included in the scan list 112, the storage processing module 124 may retrieve the location data 120 that is associated with or corresponds to the scan list 112. Thereafter, the location server 122 may provide the location data 120 to the client device 200 that provided the request.

In some implementations, the memory 310 includes a datastore 318 for storing information. The datastore 318 may use a flat file, database, linked list, tree, or other data structure to store the information. In some implementations, the datastore 318, or a portion thereof, may be distributed across at least one other device, such as a server, a network storage device, and so forth. As illustrated in FIG. 3, the datastore 318 may include at least one of the scan list 112, the score data 218, and the formula data 220. The datastore 318 may also include the location datastore 126 that includes the location data 120 and the reliable scan list 130. The datastore 318 may include other data (not shown) which may include information such as administrator preferences, account information associated with the user 102, and so forth.

Figure 4:
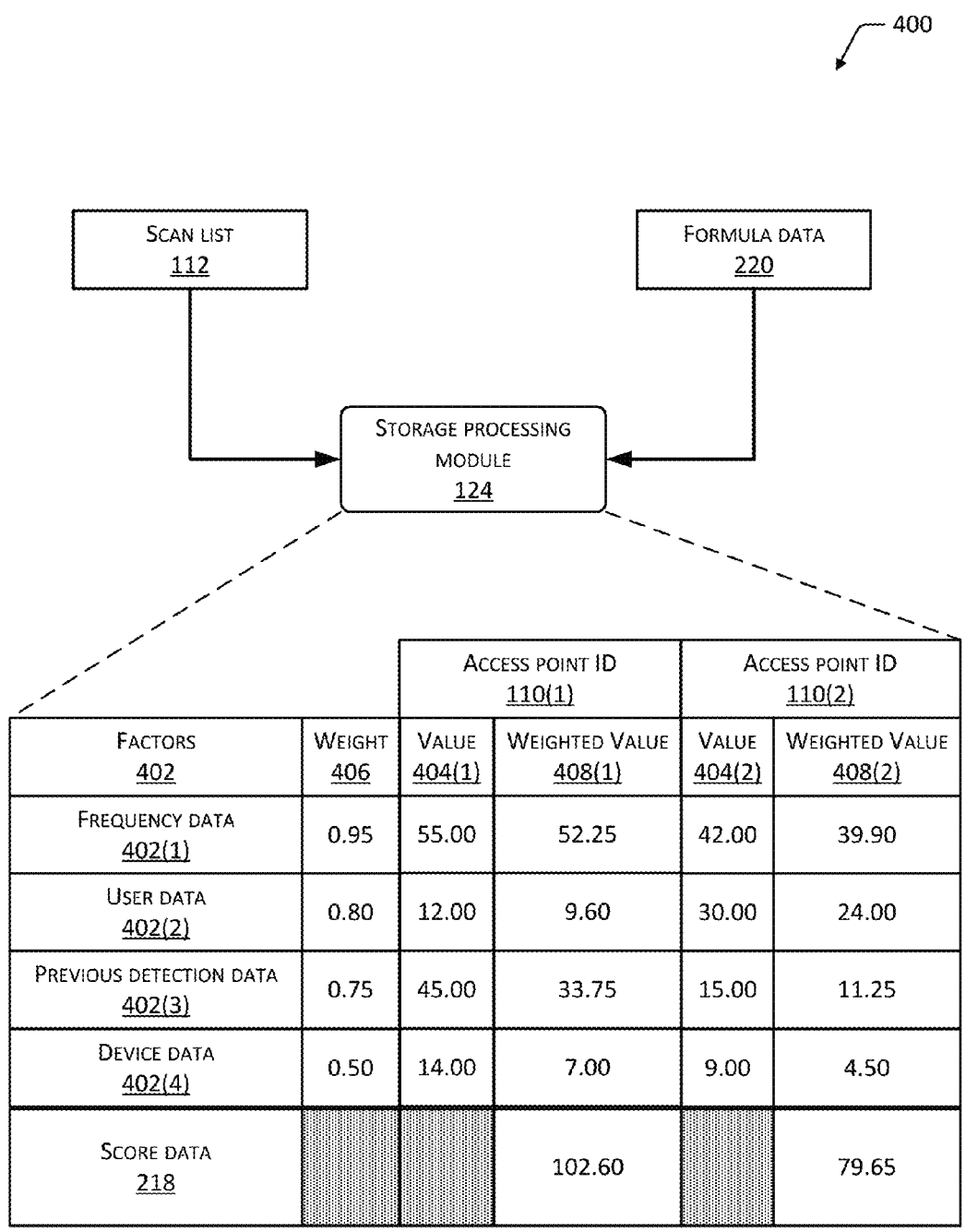
FIG. 4 is a block diagram of a storage processing module determining score data for the access points using the scan list and formula data as inputs.

FIG. 4 is a block diagram 400 of the storage processing module 124 determining score data 218 for the access points 110(1) and 110(2) using the scan list 112 and the formula data 220 as inputs. The formula data 220 including factors 402. The factors 402 include at least one of frequency data 402(1), user data 402(2), previous detection data 402(3), or device data 402(4).

The frequency data 402(1) may represent a value 404 indicative of the number of times a particular ID (e.g., the access point ID 110(1)) is detected over a predetermined period of time. For example, if the access point ID 110(1) has been detected at least 91 times over the last 54 days, the storage processing module 124 generates a value 404 of "55.00" for the access point ID 110(1). If the particular query has not been executed at least 91 times over the last 54 days, the storage processing module 124 may generate a different value 404 (e.g., "0.00") for the access point ID 110(1). An access point ID 110(1) query that is detected for a relatively high number of detections may be indicative that the access point ID 110(1) is reliable.

The user data 402(2) may represent information about a user 102 associated with the client device 200, the access point (108), the stationary device (106), or the mobile device (102). Certain known users 102 may be predetermined to be trusted or have a history of providing reliable information to the location server 122. For example, the user data 402(2) may comprise credentials provided by the user 102. The storage processing module 124 may query a datastore that stores a plurality of predetermined credentials, and determine whether the credentials provided by the user 102 correspond or match any of the credentials of the datastore. If a match is found, the storage processing module 124 may determine or assign a value 404 based on the match.

The previous detection data 402(3) may comprise information about previous detections associated with the IDs of the scan list 112. For example, if the storage processing module 124 determines that the access point ID 110(1) has been detected more than a threshold amount of times at a particular location, the location server 122 may determine or assign a value 404(1) for the access point ID 110(1). In FIG. 4, the storage processing module 124 determines that the access point ID 110(1) has been detected more than a threshold amount of times at a particular location and assigns a value 404(1) of "45.00".

The device data 402(4) may comprise information about the computing device 200, the access point (108), the stationary device (106), or the mobile device (102). For example, the storage processing module 124 may determine or assign a value 404 based on the manufacturer of the client device 200 that provides the scan list 112 to the location server 122. In another example, the storage processing module 124 may determine or assign a value 404 based on the type of client device 200 (e.g., a set-top box, a gaming console, a mobile phone, and so forth) that provides the scan list 112 to the location server 122. In FIG. 4, the storage processing module 124 determines that the access point ID 110(1) is associated with one of a plurality of predetermined manufacturers, and assigns a value 404(1) of "45.00".

Other factors 402 (not shown) may be used by the storage processing module 124 to determine reliability. For example, the storage processing module 124 may compare a first scan list 112 acquired by the mobile device 104 with a second scan list 112 acquired by the stationary device 106. The storage processing module 124 may determine that the first scan list 112 received from the stationary device 106 is more reliable if the first scan list 112 matches the second scan list 112 acquired by the mobile device 104.

The formula data 220 may include weight factors or weights 406. The weight factors 406 are configured to allow configuration of how the score data 218 is generated. The storage processing module 124 may be configured to enable an administrative user to select or change one or more of the weight factors 406 using an input device (e.g., a keyboard).

In FIG. 4 the weight factor 406 is illustrated as a factor to develop a weighted mean, wherein the value 404 is multiplied by the weight factor 406. For example, the weight factor 406 may be set to less than one to diminish the impact of a particular factor 402 or greater than one to increase the impact of a particular factor 402 on the score data 218. In other implementations, functions other than, or in addition to, the weighted mean may be used.

Continuing the example, the value for the frequency data 402(1) is given a relatively high weight factor 406 of "0.95", while the device data 402(4) has a weight factor 406 of "0.50". As a result, the value of the score data 218 may be more significantly impacted by the frequency data 402(1) than the device data 402(4). The weight factors 406 may be adjusted, allowing for the weights to be tailored to particular analytical tasks.

The weighted values 408 may be summed or otherwise combined to generate the value of the score data 218. Continuing the example, in this illustration the access point ID 110(1) has a total weight of "102.60", and the access point ID 110(2) has a total weight of "79.65". Using these techniques, the storage processing module 124 is thus able to generate the score data 218. The storage processing module 124 may determine whether the access point IDs 110(1) and 110(2) are reliable. For example, the storage processing module 124 may determine that a particular access point ID 110 is reliable if the generated score associated with the particular access point ID 110 is greater than or equal to "100.00". In the example depicted in FIG. 4, the storage processing module 124 would determine that access point ID 110(1) is reliable because the score (i.e., 102.60) is greater than "100.00", and the access point ID 110(2) would be determined to be not reliable because the score (i.e., "79.65") is not equal to or greater than "100.00".

In some implementations, the storage processing module 124 stores a limited number of IDs associated with the location data 120 even if more than the limited number of IDs have been determined to be reliable. For example, the storage processing module 124 may store the two access point IDs 110 having the two highest scores. By limiting the storage of the IDs, the location server 122 may provide a more efficient location determination service by only analyzing the limited number of IDs during a request for location data 120.

Figure 5:
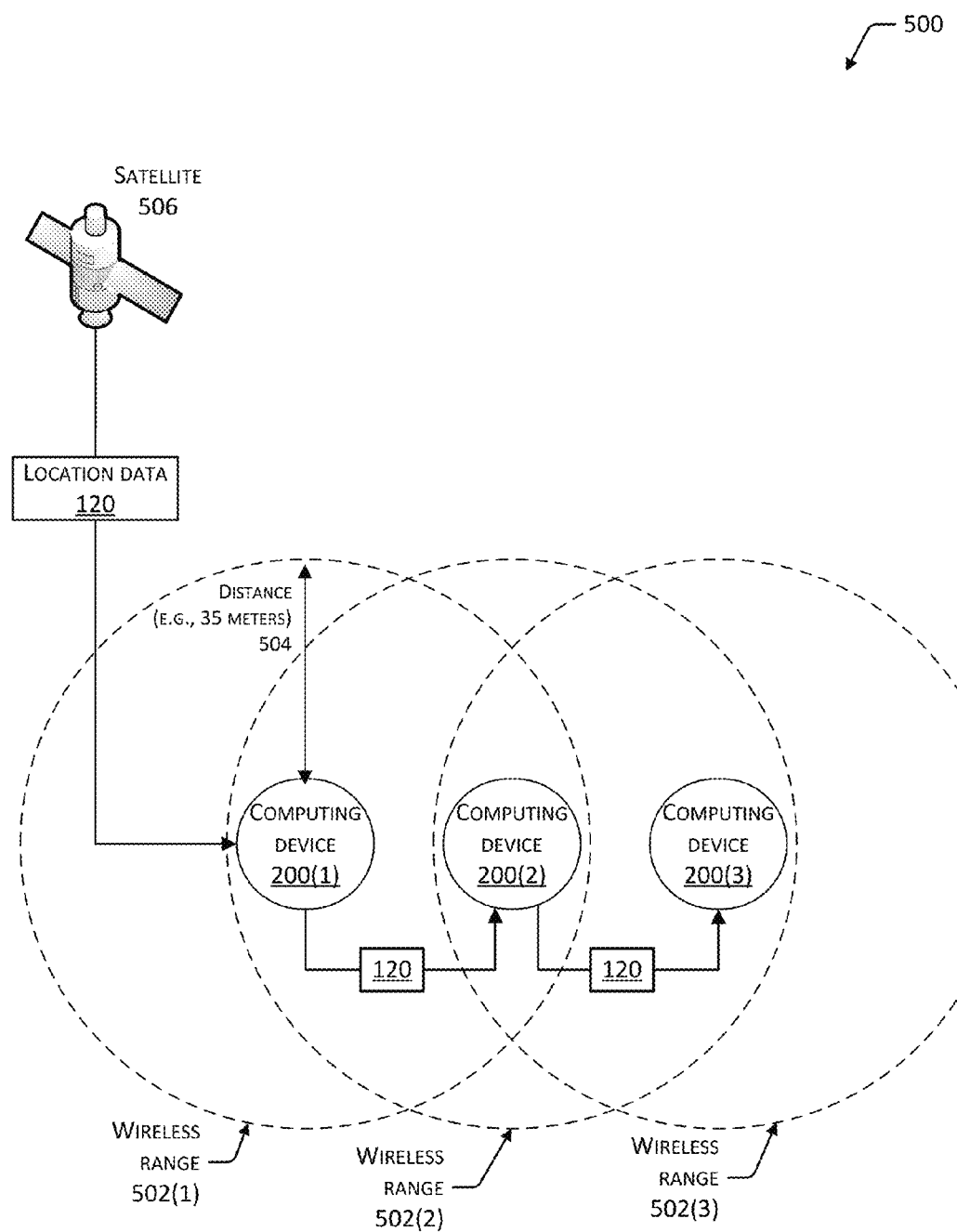
FIG. 5 is an illustrative system for transferring location data across computing devices.

FIG. 5 is an illustrative system 500 for transferring location data 120 across computing devices 200. Three computing devices 200(1), 200(2), and 200(3) are depicted. The computing device 200(1) is configured to wirelessly communicate with other computing devices 200 within a wireless range 502(1). The computing device 200(2) is configured to wirelessly communicate with other computing devices 200 within a wireless range 502(2). The computing device 200(3) is configured to wirelessly communicate with other computing devices 200 within a wireless range 502(3). The wireless communication between the computing devices 200 depicted in FIG. 5 may comprise a variety of wireless communication such as Wi-Fi®, Bluetooth®, ZigBee®, and so forth.

The wireless ranges 502 are limited by a distance 504. The distance 504 may be based on the computing device 200 capabilities, may be specified by an administrator, may have a default value, and so forth. For example, the predetermined distance 504 may be 35 meters.

In FIG. 5, the computing device 200(1) is configured to receive location data 120 from a satellite 506. The location data 120 comprises information representing the location of the computing device 200(1). In this example, the computing devices 200(2) and 200(3) are not able to receive location data 120 from the satellite 506. The computing devices 200(1), 200(2), and 200(3) may be located within a large building that is in a large city environment having many large buildings. The computing device 200(1) may be located near a window, allowing for the computing device 200(1) to receive signals from the satellite 506. The computing devices 200(2) and 200(3) may be located near the center of the building, causing the computing devices 200(2) and 200(3) to be unable to communicate with the satellite 506.

In FIG. 5, after the computing device 200(1) receives the location data 120 from the satellite 506, the computing device 200(1) provides the location data 120 to the computing device 200(2) which is within the wireless range 502(1). By providing the location data 120 to the computing device 200(2), a determination of an estimated location of the computing device 200(2) may be made.

After the computing device 200(2) receives the location data 120 from the computing device 200(1), the computing device 200(2) provides the location data 120 to the computing device 200(3) which is within the wireless range 502(2). By providing the location data 120 to the computing device 200(3) a determination of an estimated location of the computing device 200(3) may be made. As the number of computing devices 200 increase through which the location data 120 is transmitted, the precision of the location is decreased.

By transferring the location data 120 across the computing devices 200 such as depicted in the system 500 of FIG. 5, the amount of information acquired by the location server 122 for location determination services may increase. For example, the computing device 200(3) may comprise the mobile device 104. The mobile device 104 and the computing device 200(2) may be located within a building such that neither device may determine its location. However, the computing device 200(1) may be located such that it may receive the location data 120. The location data 120 received by computing device 200(1) may be shared across the computing device 200(2) and in turn to the mobile device 104. The mobile device 104 may acquire a scan list 112 (not shown) and the location data 120, and the mobile device 104 may provide the acquired scan list 112 and the location data 120 to the location server 122 for further processing (e.g., reliability processing).

Although FIG. 5 depicts the satellite 506 providing the location data 120, in other implementations the location data 120 is provided by other systems. These systems may include inertial navigation systems, dead reckoning navigation systems, network positioning, tags, and so forth.

Figure 6:
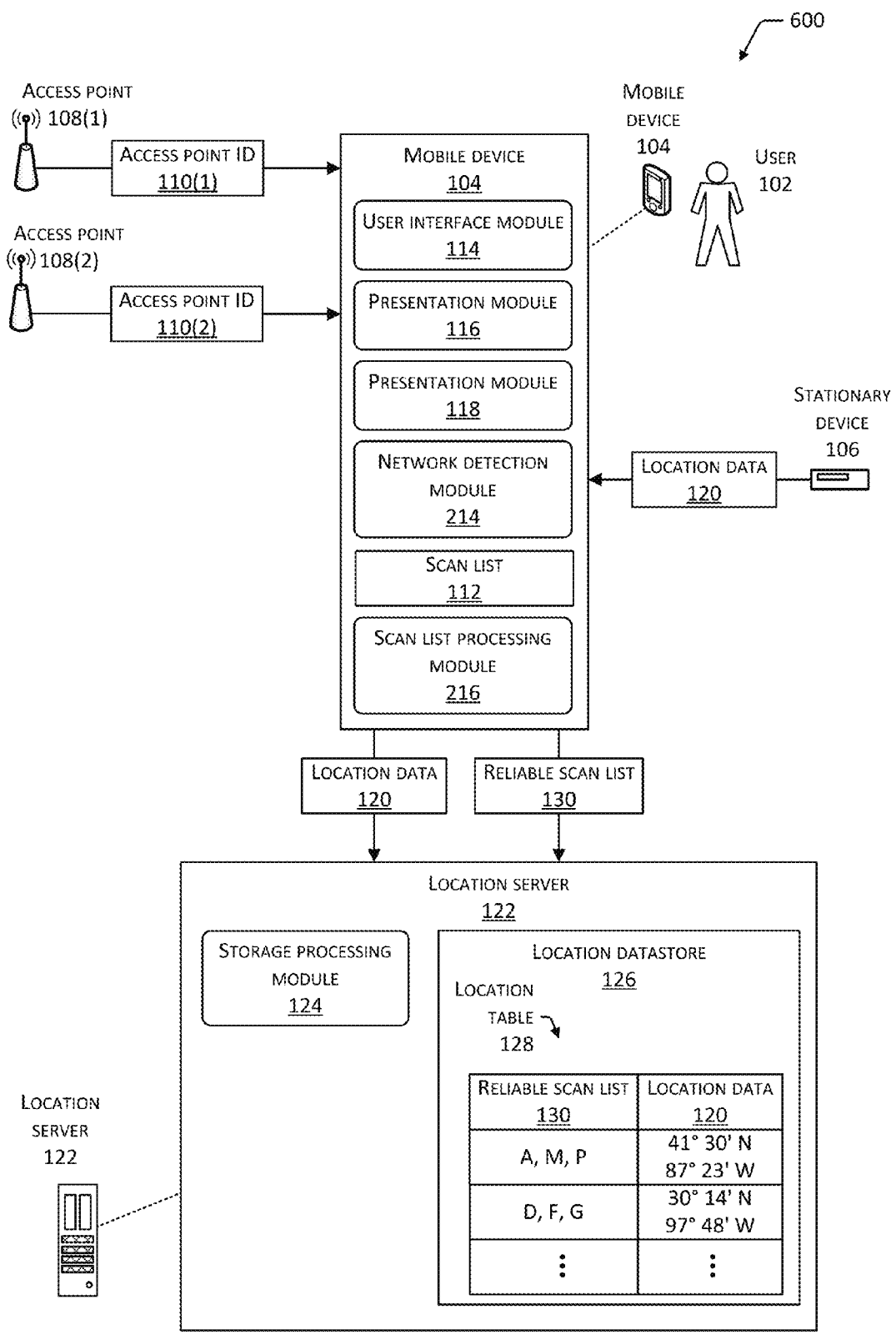
FIG. 6 is an illustrative system for storing reliable scan lists and depicts the mobile device being configured to generate the scan list and determine whether the scan list is reliable.

FIG. 6 is an illustrative system 600 for storing reliable scan lists 130. The mobile device 104 is configured to generate the scan list 112 and determine whether the scan list 112 is reliable.

The mobile device 104 receives the access point ID 110(1) from the access point 108(1), and the access point ID 110(2) from the access point 108(2). The mobile device 104 may receive the access point IDs 110(1) and 110(2) using the network detection module 214, which may generate the scan list 112 that includes the access point IDs 110(1) and 110(2).

The scan list processing module 216 may determine whether the scan list 112 is reliable based on factors described herein. In FIG. 6, the stationary device 106 is configured to provide the location data 120 to the mobile device 104. In this example, the scan list processing module 216 generates the reliable scan list 130 that includes the access point IDs 110 that are deemed reliable.

The mobile device 104 provides the location data 120 and the reliable scan list 130 to the location server 122. The storage processing module 124 then stores the location data 120 and the reliable scan list 130 in the location table 128.

Figure 7:
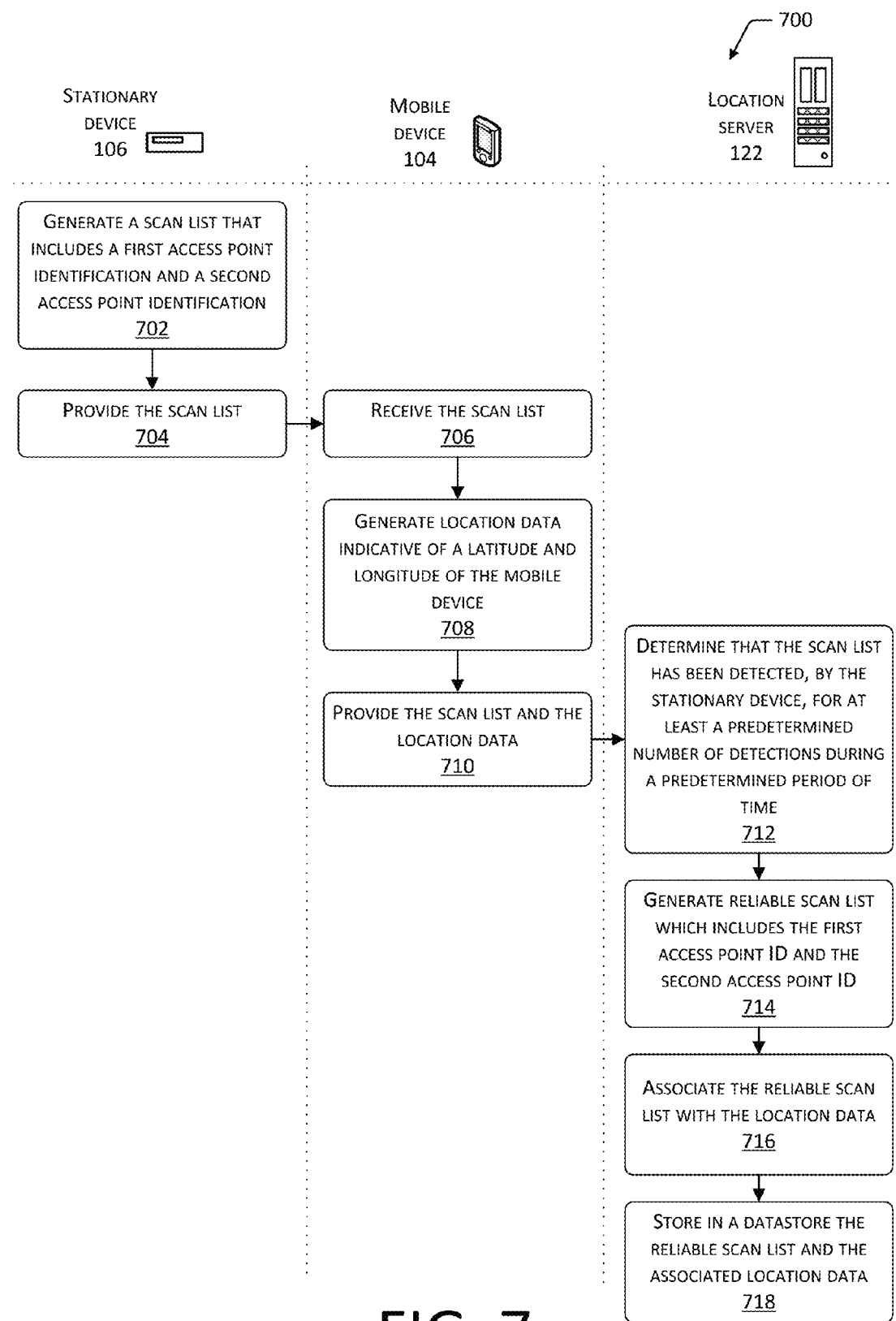
FIG. 7 is a flow diagram illustrating a process of determining that a scan list is reliable based on the stationary device detecting the scan list a number of times over a period of time, and updating a datastore with the reliable scan list and associated location data.

FIG. 7 is a flow diagram illustrating a process 700 of determining that a scan list 112 is reliable based on the stationary device 106 detecting the scan list 112 a number of times over a period of time, and updating a datastore with the reliable scan list 130 and associated location data 120. Although the process 700 is described with reference to the flowchart illustrated in FIG. 7, many other methods performing the acts associated with the process 700 may be used. For example, the order of the steps may be changed, some of the steps described may be optional, and additional steps may be included.

At 702, the stationary device 106 generates a scan list 112 that includes a first access point ID 110(1) and a second access point ID 110(2). The access point ID 110(1) may identify a first access point 108(1) detected by the stationary device 106. The access point ID 110(2) may identify a second access point 108(2) detected by the stationary device 106. In some implementations, the stationary device 106 is configured to determine reliability of the scan list 112. The determination of reliability may be based on longevity. For example, the stationary device 106 may determine that a particular access point ID 110 is reliable once the access point ID 110 has been detected for at least a designated period of time between a first time and a second time. For example, the stationary device 106 may determine that an access point ID 110 is reliable in response to a determination that the stationary device 106 has detected the access point ID 110 for over 95% of the time between the first of January and the first of February. In another example, the determination of reliability may be based on availability information. The availability information may indicate how often the network node wirelessly provides an identification of the network node. For example, the access point ID 110(1) may include information indicating that the access point ID 110(1) is scheduled to be available twenty-four hours per day, seven days per week, which may be associated with a relatively high degree of reliability. The network node may comprise a computing device such as a Bluetooth® accessory or host, a Wi-Fi® access point 108, a client computing device, and so forth.

At 704, the stationary device 106 provides the scan list 112 to the mobile device 104. In some implementations, the stationary device 106 is configured to operatively connect to the mobile device 104 when the mobile device 104 is located within a distance of the stationary device 106. The distance may comprise the range in which the mobile device 104 and the stationary device 106 may communicate with one another. For example, where the mobile device 104 and the stationary device 106 are configured to communicate with one another using Wi-Fi®, the range may comprise 115 feet indoors and 333 feet outdoors.

At 706, the mobile device 104 receives the scan list 112 from the stationary device 106. At 708, the mobile device 104 generates location data 120 indicative of a latitude and longitude of the mobile device 104. The location data 120 may be generated based on a satellite-based navigation system.

At 710, the mobile device 104 provides the scan list 112 and the location data 120 to the location server 122. The mobile device 104 may associate the location data 120 with the scan list 112. The location data 120 may be associated with the scan list 112 based on the scan list 112 being generated at or near the location indicated by the location data 120.

At 712, the location server 122 determines that the scan list 112 (e.g., the access point(s) thereon has been detected, by the stationary device 106, for at least a predetermined number of detections during a predetermined period of time. At 714, the location server 122 generates reliable scan list 130 that includes the first access point ID 110(1) and the second access point ID 110(2).

At 716, the location server 122 associates the reliable scan list 130 with the location data 120. The location data 120 may be associated with the reliable scan list 130 based on the ID information of the scan list 112 being generated at or near the location indicated by the location data 120.

At 718, the location server 122 stores in a datastore 126 the reliable scan list 130 and the associated location data 120. For example, the location server 122 may store in the location datastore 126 the reliable scan list 130 and the associated location data 120.

The location datastore 126 may be configured to store a plurality of different reliable scan list 130 that are associated with a plurality of different position data 120. The plurality of different reliable scan list 130 and the plurality of different location data 120 may be used to determine locations for other mobile devices 104. In one example, a second mobile device 104 provides a request for location data 120 to the location server 122. The request may include a scan list 112 acquired by the second mobile device 104. Using the scan list 112, the location server 122 may query the location table 128 for a match of the scan list 112. Once a match is determined, the location server 122 selects the location data 120 that is associated with the match, and the location server 122 provides the location data 120 to the second mobile device 104.

Figure 8:
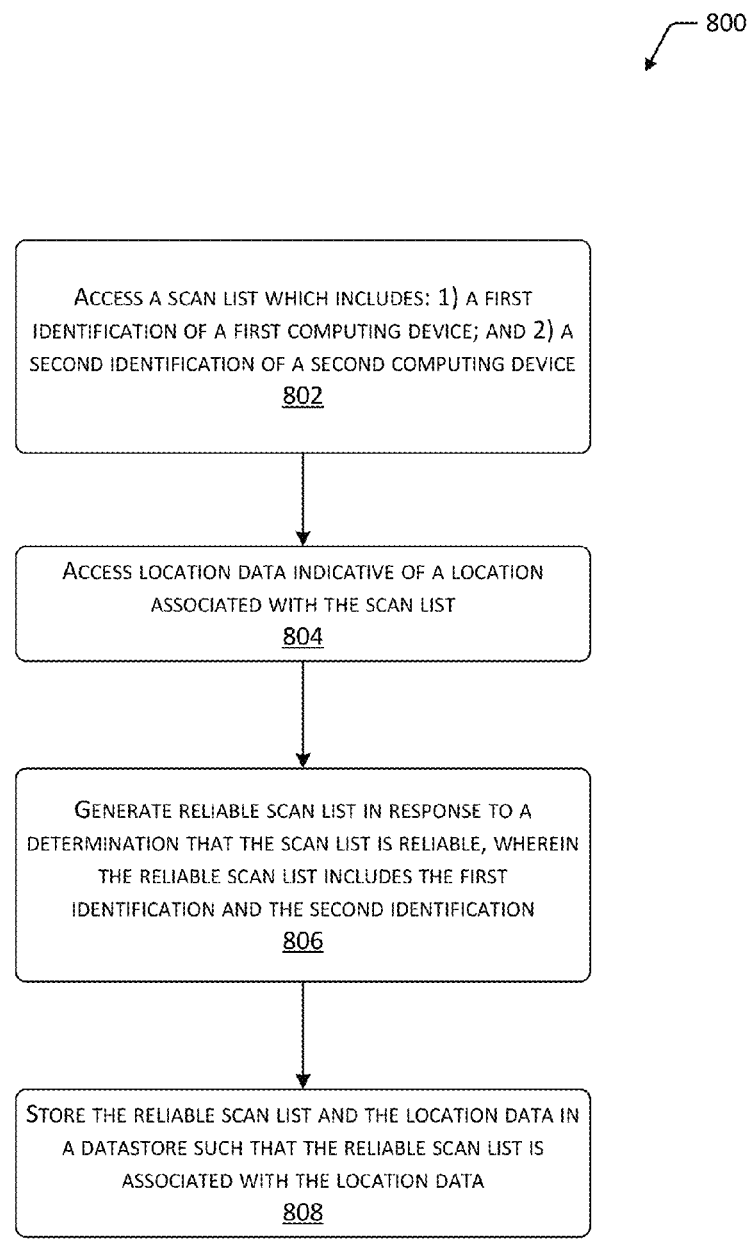
FIG. 8 is a flow diagram illustrating a process of storing a reliable scan list and associated location data.

FIG. 8 is a flow diagram illustrating a process of storing a reliable scan list 130 and associated location data 120. Although the process 800 is described with reference to the flowchart illustrated in FIG. 8, many other methods performing the acts associated with the process 800 may be used. For example, the order of the steps may be changed, some of the steps described may be optional, and additional steps may be included.

At 802, the location server 122 accesses a scan list 112 that includes: 1) a first ID of a first computing device; and 2) a second ID of a second computing device. For example, the mobile device 104 may provide the scan list 112 during a process of updating or storing information in the location server 122. In one example, the first ID comprises a MAC address of stereo device, and the second ID comprises an SSID of an access point 108.

The location server 122 may access the scan list 112 in response to the client device 200 providing the scan list 112 to the location server 122. The client device 200 may provide the scan list 112 to the location server 122 when the user 102 is participating in the process of collecting of information for the location datastore 126, which may result in an increase in the ability or the accuracy of determining locations for various computing devices that use the location datastore 126.

The scan list 112 may be generated by various client devices 200. In some implementations, the stationary device 106 generates the scan list 112 and provides the scan list 112 to the location server 122. In other implementations, the stationary device 106 generates the scan list 112 and provides the scan list 112 to the mobile device 104, which in turn provides the scan list 112 to the location server 122. In yet other implementations, the mobile device 104 may generate the scan list 112 and provide the scan list 112 to the location server 122.

At 804, the location server 122 accesses location data 120 indicative of a location associated with the scan list 112. The location data 120 may be generated by at least one of the mobile device 104 or the stationary device 106. The location data 120 may represent a latitude and longitude associated with the scan list 112. The location data 120 may represent the geolocation of the client device 200 or a fuzzed location of the client device 200. In implementations, the location data 120 is associated with the reliable scan list 130 based on the location data 120 indicating the latitude and longitude of the mobile device 104 when the mobile device 104 acquires the scan list 112 from the stationary device 106.

At 806, the location server 122 generates reliable scan list 130 in response to a determination that the scan list 112 is reliable. The reliable scan list 130 includes the first ID and the second ID.

The determination of whether the scan list 112 is reliable may be based on a variety of factors. In one example, the determination of reliability is based on longevity information associated with the network node. The longevity information may comprise historical information about how often the identifications of the scan list 112 have been provided by the network nodes. The scan list 112 may be deemed reliable if the stationary device 106 has detected the scan list 112 for at least a predetermined number of detections during a predetermined period of time. Determining whether scan list 112 may include determining whether each of the individual identifications (e.g., the access point IDs 110) are reliable. In some implementations, a portion of the identifications included within the scan list 112 may be determined to be reliable, while another portion is not determined to be reliable.

In some implementations, whether the scan list 112 is determined reliable may be based on the user 102 of the client device 200. For example, reliability may be determined if the credentials provided by the user 102 are equal to one of a plurality of predetermined credentials. The location server 122 may store a list of predetermined credentials, and the location server 122 may query the list of predetermined credentials to determine whether the credentials provided by the user 102 match or correspond to one of the credentials of the predetermined credential list.

Reliability may be determined based on the manufacturer of the computing device 200 that produced the identification of the computing device 200. For example, the location server 122 may analyze the access point ID 110(1) to determine the manufacturer of the access point 108(1) that provided the access point ID 110(1). The location server 122 may store a list of predetermined manufacturers that has been approved such that information (e.g., the access point IDs 110) provided by access points 108 that are manufactured by one of these predetermined manufacturers is deemed reliable.

In some implementations, reliability is determined based on score data 218. For example, for a first access point ID 110, the location server 122 may determine a score based on the formula data 220. If the score is greater than or equal to a threshold score, the first access point ID 110 is deemed reliable.

Reliability may be determined based the amount of previous detections of the scan list 112. For example, if the access point ID 110(1) has been detected more than a threshold amount of times at a particular location, the location server 122 may determine that the access point ID 110(1) is reliable.

In some implementations, the location server 122 determines that scan list 112 is reliable based on whether the identifications included within the scan list 112 correspond to one of a plurality of predetermined identifications. For example, the location server 122 may store a list of predetermined access point IDs 110 that have been predetermined to provide reliable information. If the access point ID 110 matches or corresponds to one of the predetermined access point IDs, the location server 122 determines that the access point ID 110 is reliable.

At 808, the location server 122 stores the reliable scan list 130 and the location data 120 in a datastore such that the reliable scan list 130 is associated with the location data 120.

In some implementations, the scan list 112 is accessed using a first computing device. For example, the location server 122 may be configured to access the scan list 112 from the memory 310. The scan list 122 may include: 1) a first ID that identifies a second computing device; and 2) a second ID that identifies a third computing device. For example, the scan list 122 may include: 1) the access point ID 110(1) that identifies the access point 108(1); and 2) the access point ID 110(2) that identifies the access point 108(2). The scan list 112 may be generated by a fourth computing device. The fourth computing device may comprise at least one of the mobile device 104 or the stationary device 106. The fourth computing device may provide the scan list 112 to a fifth computing device (e.g., the mobile device 104 or the stationary device 106) that in turn provides the scan list 112 to the first computing device. The location data 120 may be accessed using the first computing device. For example, the location server 122 may be configured to access the location data 120 from the memory 310. The scan list 112 may be determined to be reliable using the first computing device. For example, the storage processing module 124 may be configured to determine whether the scan list 112 is reliable. The reliable scan list 130 may be stored using the first computing device. For example, the location server 122 may be configured to store the reliable scan list 130 in the location table 128.

Those having ordinary skill in the art will readily recognize that certain steps or operations illustrated in the figures above can be eliminated or taken in an alternate order. Moreover, the methods described above may be implemented as one or more software programs for a computer system and are encoded in a computer readable storage medium as instructions executable on one or more processors.

Embodiments may be provided as a computer program product including a non-transitory computer readable storage medium having stored thereon instructions (in compressed or uncompressed form) that may be used to program a computer (or other electronic device) to perform processes or methods described herein. The computer readable storage medium can be any one of an electronic storage medium, a magnetic storage medium, an optical storage medium, a quantum storage medium, and so forth. For example, the computer readable storage media may include, but is not limited to, hard drives, floppy diskettes, optical disks, read-only memories (ROMs), random access memories (RAMs), EPROMs, EEPROMs, flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments, and situations. Although the present disclosure is written with respect to specific embodiments and implementations, various changes and modifications may be suggested to one skilled in the art, and it is intended that the present disclosure encompass such changes and modifications that fall within the scope of the appended claims.

What is claimed is:

1. A system comprising:
a communication interface;
a memory storing computer-executable instructions;

a processor in communication with the communication interface and the memory, the processor configured to execute the computer-executable instructions to:
  receive, at a first time, first access point data from a mobile device that is configured to operatively connect to the system, wherein:
    the mobile device received the first access point data from a stationary device;
    the stationary device generated the first access point data at a second time prior to the first time after detecting a first access point and a second access point;
    the first access point data includes:
      first data corresponding to the first access point including an identifier of the first access point and information about a longevity of the first access point for a period of time between the second time and the first time; and
      second data corresponding the second access point including an identifier of the second access point and information about a longevity of the second access point for the period of time between the second time and the first time;
  receive location data indicative of a latitude and longitude of the mobile device; and
  determine, based at least in part on the information about the longevity of the first access point, to store in a datastore the identifier of the first access point and the location data, wherein the datastore is used to determine locations for other mobile devices.

2. The system of claim 1, wherein the processor is configured to execute the computer-executable instructions to determine, based at least in part on the information about the longevity of the second access point, not to store in the datastore the identifier of the second access point.

3. A computer-implemented method comprising:
  receiving, at a first time from a first device, data corresponding to a network node and a location, wherein:
    the data corresponding to the network node includes an identifier of the network node;
    the first device received the data corresponding to the network node from a second device;
    the second device generated the data corresponding to the network node at a second time prior to the first time;
    the data corresponding to the network node further includes information regarding operation of the network node for a period of time between the second time and the first time; and
    the location corresponds to at least one of the network node, the first device, or the second device;
  determining to add the identifier of the network node and the location to a datastore based at least in part on the data corresponding to the network node; and
  storing the identifier of the network node and the location in the datastore.

4. The method of claim 3, wherein:
  the second device comprises a stationary device; and
  the determination of adding the identifier of the network node includes determining that the identifier has been detected, by the stationary device, at least a predetermined number of detections during the period of time between the second time and the first time.

5. The method of claim 3, further comprising determining a first score for the identifier based at least partly on the information regarding operation of the network node for the period of time, wherein the determination of adding the identifier of the network node includes determining that the first score is greater than or equal to a threshold score.

6. The method of claim 3, wherein the data corresponding to the network node includes information indicating a length of the period of time representative of how long the data corresponding to the network node has been available.

7. The method of claim 3, wherein the determination of adding the identifier of the network node includes determining that an amount of previous detections for the identifier is equal to or greater than a threshold amount of previous detections.

8. The method of claim 3, further comprising:
  storing data representative of a plurality of predetermined credentials; and
  receiving credentials from the first device, wherein the determination of adding the identifier of the network node includes determining that the credentials match at least one credential of the plurality of predetermined credentials.

9. The method of claim 3, wherein the determination of adding the identifier of the network node includes determining that the identifier corresponds to at least one predetermined identifier of a plurality of predetermined identifiers.

10. The method of claim 3, wherein:
  the first device comprises a mobile device configured to generate the location using a satellite-based navigation system; and
  the second device comprises a stationary device that is not expected to be transported during normal usage.

11. The method of claim 3, wherein:
  the first device comprises a mobile device;
  the second device comprises a stationary device that is not expected to be transported during normal usage; and
  the stationary device is configured to provide the location to the mobile device.

12. The method of claim 3, wherein:
  the second device comprises a stationary device that is not expected to be transported during normal usage;
  the first device comprises a mobile device; and
  the location is associated with the identifier based on the location being equal to a latitude and a longitude of the mobile device when the mobile device acquires the identifier from the stationary device.

13. A mobile device comprising:
  a communication interface;
  a memory storing computer-executable instructions;
  a processor in communication with the communication interface and the memory, the processor configured to execute the computer-executable instructions to:
    receive first scan list data from a device, the first scan list data including a first identifier of a first network node, wherein the device is not the first network node;
    obtain location data indicative of a location associated with one or more of the first network node, the device, or the mobile device;
    determine second scan list data including the first identifier of the first network node, wherein correspondence between the first scan list data and the second scan list data indicates reliability of the first scan list data; and
    provide the first scan list data, the second scan list data, and the location data to a remote computing device.

14. The mobile device of claim 13, wherein:
  the device is a stationary device that is not expected to be transported during normal usage; and the first scan list data further includes information about one or more of reliability of the first network node, longevity of the first network node, the device, or user associated with the device.

15. The mobile device of claim 13, wherein:
the network node is an access point; and
the device is configured to generate the first scan list data by scanning for access points.

16. The mobile device of claim 13, wherein the processor is configured to execute the computer-executable instructions to:
provide information about one or more of the mobile device or a user of the mobile device to the remote computing device, wherein the information about the one or more of the mobile device or the user of the mobile device indicates a reliability of the first network node.

17. The system of claim 1, further comprising computer-executable instructions to:
determine a count of stored identifiers to be less than a threshold count of stored identifiers configured for providing a location determination service;
wherein the identifier of the first access point and the location data is further stored in the datastore based at least in part on the count of stored identifiers being less than the threshold count of stored identifiers.

18. The system of claim 1, further comprising computer-executable instructions to:
receive second access point data from the mobile device, the second access point data corresponding to the first access point and the second access point, wherein the mobile device generated the second access point data subsequent to the second time, after detecting the first access point and the second access point; and
determine correspondence between the first access point data and the second access point data;
wherein the identifier of the first access point is stored in the datastore further based at least in part on the correspondence between the first access point data and the second access point data.

19. The method of claim 3, further comprising:
determining a count of stored identifiers to be less than a threshold count of stored identifiers configured for providing a location determination service;
wherein the identifier of the network node and the location are added to the datastore based at least in part on the count of stored identifiers being less than the threshold count of stored identifiers.

20. The method of claim 3, further comprising:
receiving access point data from the first device, the access point data including an indication of the network node; and
determining correspondence between the access point data from the first device and the data corresponding to the network node;
wherein the identifier of the network node and the location are added to the datastore based at least in part on the correspondence between the access point data and the data corresponding to the network node.

* * * * *